United States Patent [19]

Buxbaum et al.

[11] 3,764,885

[45] Oct. 9, 1973

[54] CONTROL LOGIC FOR SWITCHING RECTIFIER SYSTEMS

[75] Inventors: Arne Buxbaum, Berlin; Horst Kahlen, Bocholt, both of Germany

[73] Assignee: Licentia Patent-Verwaltungs GmbH, Frankfurt am Main, Germany

[22] Filed: Aug. 18, 1971

[21] Appl. No.: 172,720

[30] Foreign Application Priority Data

Aug. 19, 1970 Germany .................. P 20 42 107.2

[52] U.S. Cl. .................. 321/13, 321/27 R, 318/257

[51] Int. Cl. .................................. H02m 1/18, H02p

[58] Field of Search ............................ 321/13, 27 R; 318/257

[56] References Cited

UNITED STATES PATENTS

| | | | |
|---|---|---|---|
| 3,586,949 | 6/1971 | Spear et al. | 318/257 |
| 3,543,118 | 11/1970 | Koenig | 318/257 X |
| 3,568,033 | 3/1971 | Gyogyi | 321/13 X |
| 3,579,080 | 5/1971 | Vollrath | 321/13 X |

FOREIGN PATENTS OR APPLICATIONS

| | | | |
|---|---|---|---|
| 261,547 | 5/1970 | U.S.S.R. | 321/13 |

*Primary Examiner*—William H. Beha, Jr.
*Attorney*—George H. Spencer et al.

[57] ABSTRACT

In a switching logic for a current controller of the type employing two groups of controlled rectifiers connected in parallel opposition and each arranged for delivering current in a respectively different direction, the logic functions are performed by operational amplifiers or comparators operating as switching elements.

12 Claims, 3 Drawing Figures

CONTROL LOGIC FOR SWITCHING RECTIFIER SYSTEMS

BACKGROUND OF THE INVENTION

The present invention relates to a switching logic for reversing rectifiers in a circuit which is arranged to not have any circulating current, particularly in a circuit in which two rectifier groups are connected in parallel so that the rectifiers of one group are poled in the opposite direction from those of the other group and the two groups are controlled so that only one is conductive at any one time.

It is known to provide circuits of this type with a logic which furnishes signals depending on the rated current value as well as the actual current value or on the conducting time of the current rectifiers, the signals being appropriately linked to block or release the triggering pulses for the two current rectifier, or converter groups.

With the replacement of tube rectifiers by thyristor rectifiers, the parallel opposition circuit with no circulating current has found increasing significance in the motor control art. This circuit has a number of advantages over a circuit with circulating current, e.g. lower expenditures for power circuit components and simpler rectifier circuits.

The known switching logics for such circuits are generally constructed of modules adapted from the digital computer art. Modules constructed by assembling individual components such as transistors, resistors or the like, are relatively expensive despite the relatively simple circuitry. The use of integrated circuits could possibly reduce these expeditures.

SUMMARY OF THE INVENTION

It is an object of the present invention to realize a further substantial reduction in cost of switching logic.

This and other objects of the invention are accomplished by the provision of a switching logic for reversing current rectifiers of the above-mentioned type in which the means for compiling, linking, storing and time delay of the signals are composed of operational amplifiers or comparators operating as switching elements.

DESCRIPTION OF THE PREFERRED EMBODIMENTS

Figure 1:
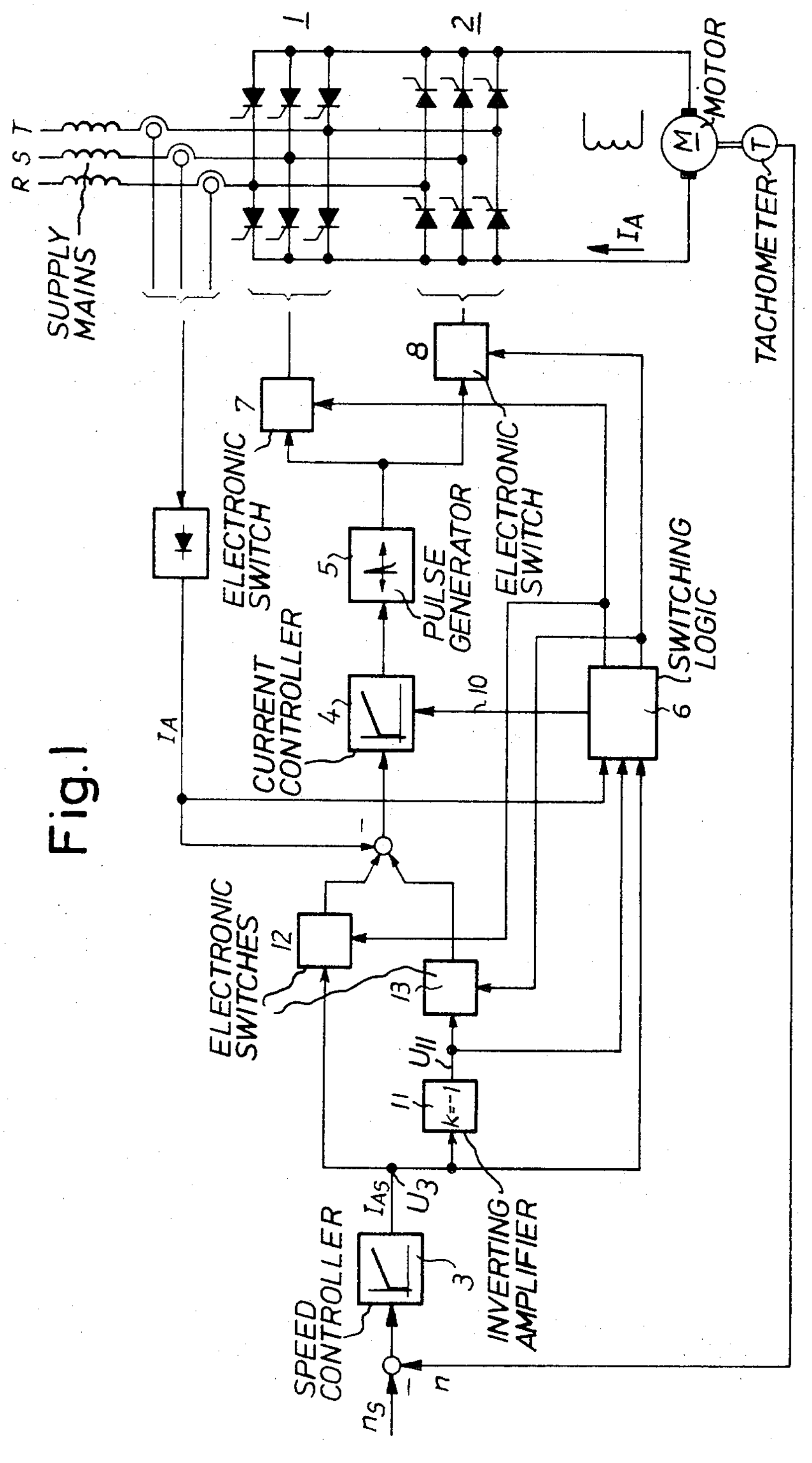
FIG. 1 is a block circuit diagram of a motor control circuit in which the logic device of the invention can be used.

FIG. 1 illustrates a basic known circuit of a speed-controlled reversing drive in a parallel opposition connection without circulating current in which the triggering pulses are switched from the one rectifier group 1 to the other rectifier group 2, depending on the direction in which current is to be applied. The control structure is arranged in accordance with the current conducting techniques usually employed in the motor control art; i.e., the speed control is effected by regulating the motor armature current.

In the illustrated embodiment an externally excited direct current shunt motor M constitutes the driving motor. A tachometer T furnishes an indication of the actual speed value $n$ which is compared with a given rated speed value $n_s$. Based on the difference between $n_s$ and $n$, a speed controller 3 forms a rated current value $I_A$ for the basic current control circuit. The current control circuit includes a current controller 4 to which is fed a control deviation value formed from the rated value $I_A$, or $-I_A$, and a value $I_A$ corresponding to the actual armature current value.

The current controller 4 controls a pulse generator 5 which furnishes the triggering pulses for the current rectifier groups 1,2. Specifically, the output from controller 4 varies the instant of occurrence, or pulse position, of the pulse from generator 5. Due to the direct phase opposition connection of the elements current rectifier groups 1 and 2, precautions must be taken to assure that only one current rectifier group at a time carries current. This is accomplished by a switching logic 6.

Depending on the value of the output of speed controller 3, switching logic 6 switches the control pulses furnished by the pulse generator 5 through only one or the other of electronic switches 7 and 8 to the corresponding current rectifier group. The switching logic monitors the actual motor armature current value $I_A$ and thus assures that upon a change in the direction of that current, the delivery of triggering pulses to the group till now carrying current is terminated only when the current has dropped below the limit of continuous current to intermittent current since otherwise there would result a current flow which would cause a circuit breaker tripping. For a 50 Hz mains and a three-phase bridge circuit the conduction time of each rectifier below the limit of continius current is $\leq 3.3$ ms, for a 60 Hz mains the corresponding time would be $\leq 2.8$ ms.

The last pulse given to the group till now carrying current, can cause a current with the mentioned conduction time. If during this time the pulses are given to the other group, there will be a short circuit between the two groups.

For safety reasons it is necessary to let at least this much time expire before the switching logic releases the pulses to the other current rectifier group. During the waiting time the current controller 4 is blocked from producing an output by a signal over line 10.

Since the actual current value determination occurs independently of the current direction by a measurement at the three phases of the input lines and subsequent rectification, there occurs via electronic switches 12 and 13, simultaneously with the switching of the pulses from one current rectifier group to the other, a switching of the polarity of the rated current value fed to current controller 4. To make both polarities available to controller 4, an inverting amplifier 11 is connected between speed controller 3 and switch 13. As is the custom in such control circuits, the rated current value $\pm I_A$ for the current controller is provided so as to have a negative polarity and correspondingly the actual current value $I_A$ is provided with a positive polarity.

The speed controller 3 and/or current controller 4 may be a PI-controller. The circuitry for such a PI-controller is disclosed in the magazine "Technische Mitteilungen AEG-TELEFUNKEN" (Technical News), 1968, page 468, FIG. 1 (top right).

The circuitry of the pulse generator 5 is disclosed in the magazine "AEG-Mitteilungen" (AEG News), 1965, page 618, FIG. 9*a*.

The circuitry of the electronic switches 7, 8, 12, 13 is disclosed in the publication "Application for FET Switches" by the firm Siliconix Limited.

The circuitry for the phase inverter amplifier 11 is disclosed in the "Handbook of Operational Amplifier Applications," 1963, page 13, of the firm Burr-Brown Research Corporation, Tucson, Arizona.

Figure 2:
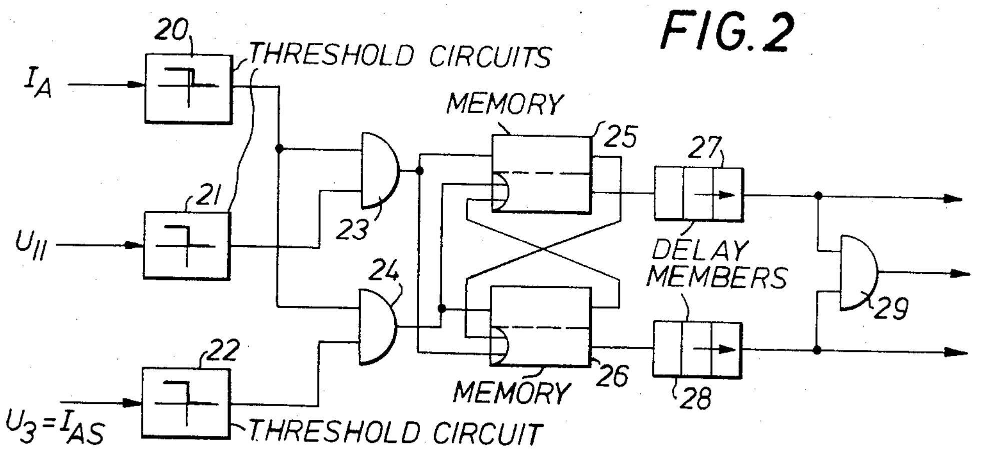
FIG. 2 is a block diagram of a logic device for the circuit of FIG. 1.

FIG. 2 shows a logic circuit which can serve as the logic 6 for creating the above-mentioned conditions for switching the triggering pulses for the reversing motor drive system of FIG. 1. The actual armature or rotor, current value $I_A$, the output voltage $U_{11}$ of the inverting amplifier 11 and the output voltage $U_3$ of the speed controller 3 are fed, as input signals to the switching logic, to threshold circuits 20, 21 and 22, respectively. When the output voltage of the speed controller 3 has a negative polarity, the output of circuit 22 provides an L (L =0 binary 1) signal and since the output voltage from amplifier 11 must then have a positive polarity, the output of circuit 21 produces an O signal. When the output voltage from controller 3 has a positive polarity, the outputs from circuits 21 and 22 are inverted.

If the actual current value $I_A$ is above a selected value, the output from circuit 20 has an O value, while if that current falls below a selected value below the limit of continius current, the output of circuit 20 flips from O to L and thus initiates the switching over from one rectifier group to the other, depending on the signals from circuits 21 and 22, by causing an output to be produced by one of the AND members 23 or 24. To store the signals from the AND members 23 and 24, memories 25 and 26 are provided. The storage is necessary since no L signal appears at the output of either one of AND members 23 and 24 when there is an O signal from circuit 20.

To prevent faulty switching, the two memories are interconnected so that one is automatically blocked when the other is producing an output.

Memory 25 is associated with AND member 23 and delay member 27, while memory 26 is associated with AND member 24 and delay member 28. Each memory is connected to apply an O signal to its delay member when an L signal appears at the output of its associated AND member. In addition an L signal from each AND member is connected to an internal OR gate of the other memory to cause that memory to apply an L signal to its respective delay member. Finally, the memories are interconnected, for security reasons, via the interval OR gates so than an L signal at the unused, or complement, output of one memory results in an L signal at that output of the other memory which is connected to the associated delay member.

The output signals of memories 25 and 26 are fed, via delay members 27 and 28, either to switches 7 and 12 or 8 and 13. One of the rectifier groups is activated each time an O signal occurs. For example, upon the appearance of an signal at the output of delay member 27, switches 7 and 12 are closed i.e., conduct and when an L signal appears at the output of member 27, switches 7 and 12 are opened.

Delay members 27 and 28 are of the type which block the transmission of pulses without any delay when the output of their respective memory has shifted from O to L, while the pulses are passed when the output of the respective memory shifts from L to O with a delay satisfying the above-mentioned safety requirements. During the waiting time after shifting of the outputs of the memories, an L signal is present at the outputs of both 27 and 28 so that an L signal is sent via an AND member 29 to the armature current controller 4 to block that controller.

The individual modules of the logic circuit are known, for example from the AEG publication "LOGISTAT Reihe I Daten und Applikationen" [series I, data and applications] (1912.102 A 24 Rgl/04.65) published in April, 1965.

The internal circuitry of comparators 20, 21, and 22 corresponds to the internal circuitry of the measuring tripper MA2 on page 29 of the above publication.

The internal circuitry of the AND members 23, 24 and 29 is shown on page 33 of the above publication.

The internal circuitry of memories 25 and 26 is illustrated on page 42 of the above publication. Memories 25 and 26 each additionally contain one OR member whose internal circuitry is shown on page 35 of the above publication.

The internal circuitry of delay members 27 and 28 corresponds to the internal circuitry of time member ZL2 on page 49 of the above publication.

An advantageous embodiment of the present invention includes a first amplifier for determining the polarity of the rated current value, the first amplifier being connected as a comparator and being arranged to be switched, via a switching transistor disposed in the regenerative feedback branch of the amplifier, into a storage mode in such a manner that the amplifier exhibits a memory behavior when the switching transistor is conductive and comparator behavior when the switching transistor is blocked. The switching of the switching transistor from its conductive to its blocked state, and vice versa, can be accomplished either with the aid of a second amplifier connected as a comparator or with the aid of a device which detects the conduction time of the current rectifier devices.

In an advantageous embodiment of the present invention the two current rectifier groups each have an operational amplifier associated therewith to control the release or blocking of the triggering pulses, and the current rectifier group required at a particular time for controlling current conduction is determined on the basis of the polarity of the output signal produced by the first amplifier, this output being connected to the noninverting input of the amplifier of one current rectifier group and to the inverting input of the amplifier of the other current rectifier group while the other input of each of the amplifiers is connected to ground. In order to create a time delay for the release or initiation, of the triggering pulses, a diode and an R C member are disposed in the noninverting input of the one amplifier and in the inverting input of the other amplifier, i.e., in each input connected to the first amplifier, to effect a delay in the release or initiation, of the triggering pulses.

To realize a certain polarity of the rated value fed to the current controller 4 by means of a second-feedback connected operational amplifier, the present invention further provides that a first switching transistor is connected in series with the input resistor for the inverting input of the second amplifier and a second switching transistor is disposed beyond the input resistor for the noninverting input of the second amplifier between the noninverting input and ground and the switching transistors are controlled, in dependence on the polarity of the output signal emitted by the first amplifier, from the conductive to the blocking state and vice versa so that the amplifier operates as a noninverting unity gain amplifier when the switching transistors are blocked and as an inverting unity gain inverting amplifier when the switching transistors are conductive.

Figure 3:
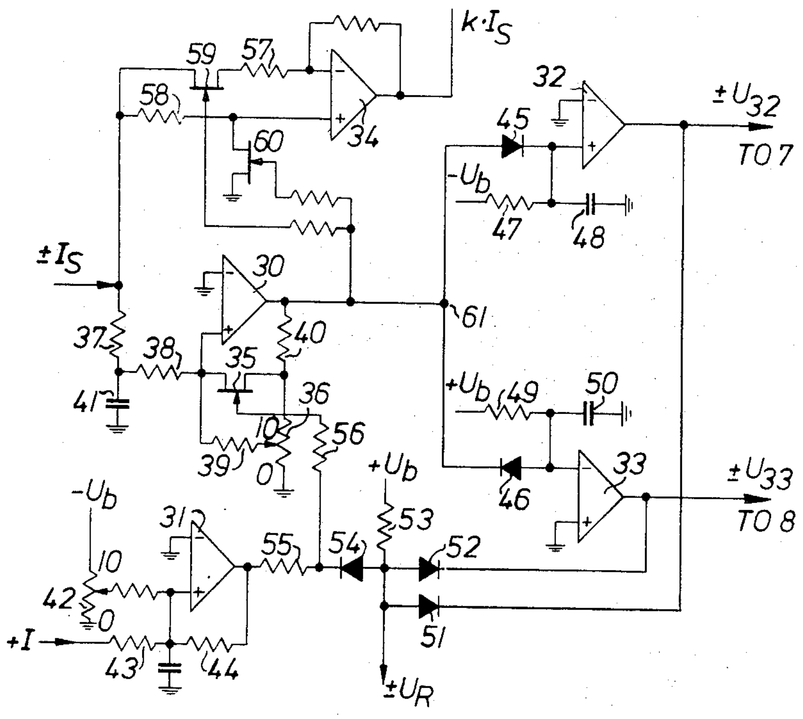
FIG. 3 is a circuit diagram of a preferred embodiment of the invention.

Configuration and operation of the switching logic according to the invention will be described below for an embodiment which is illustrated in FIG. 3, further inventive features distinguishing the invention also being pointed out.

In the embodiment shown in FIG. 3, the determination of the polarity of the rated current value $I_s$ (corresponding to $I_A$ of FIG. 1) and the storage of the corresponding signal are both preformed by a first amplifier 30 which is designed as a comparator having a hysteresis characteristic.

The comparator has a hysteresis characteristic when there is a regenerative feedback by transistor 35 or resistor 39. That means : the input voltage to get an alternation of polarity of output voltage must be greater than the limit given by the feedback. The amplifier 30 can be switched to storage operation by unblocking a switching transistor 35 in the regenerative feedback branch and which is preferably a field effect transistor. By blocking field effect transistor 35 and placing the movable tap of potentiometer 36 at its position "O," the amplifier is caused to operate as a threshold device, or zero comparator. When the rated voltage is positive, the amplifier 30 produces a positive nominal output voltage, which equals its maximum positive output voltage. For a negative rated voltage due to current $I_s$, amplifier 30 produces a negative nominal output voltage. By adjusting the movable tap of potentiometer 36 in the direction toward "10" it is possible to provide a slight hysteresis so that the amplifier 30 will not continuously be switched by harmonics at a low rated voltage. When the field effect transistor 35 is conductive, the amplifier 30 has such a strong hysteresis, because of the appropriately designed resistors 36, 37, 38, 39 and 40, that it can no longer be switched by the rated voltage. If necessary, the rated voltage fed to amplifier 30 can be smoothed by a capacitor 41.

Field effect transistor 35 is controlled, and thus amplifier 30 is switched, via a second amplifier 31 which is connected to act as a comparator, or threshold device. A potentiometer 42, to which a negative operating voltage $U_b$ is applied, serves to set a threshold for response to the actual current value I(corresponding to $I_A$ of FIG. 1) which is fed to amplifier 31 via an input resistor 43. Potentiometer 42 is so adjusted that the amplifier 31 switches to produce a negative output voltage in all operating ranges of the current rectifier group only below the limit of continuous current.

Because of the harmonics in the output voltage of the rectifier group there is a changing in the flow of current from continuous current to intermittent current by reducing the mean value of current from maximum to zero.

With an actual current value of zero, the amplifier 31 produces a negative nominal output voltage, which blocks field effect transistor 35, due to the negative input voltage provided by potentiometer 42. If the actual current value which is always positive or zero, exceeds the negative value set at potentiometer 42, amplifier 31 will switch to a positive nominal output voltage rendering field effect transistor 35 conductive.

If necessary, an average can be formed of the actual current value I or it can be smoothed by a capacitor 44. Instead of using comparator 31 for determining the actual current value, the signal for releasing the switching process may also be furnished by a known device (not shown) which determines the conduction time of the current rectifier elements. The output signal of this device would then be used to control the field effect transistor 35 so that amplifier 30 is switched from storage to comparator function when the rectifier conduction time has fallen below a settable time which is shorter than the conduction time for a current without interruptions.

The circuit thus operates in such a manner that the amplifier 30 can be switched by the rated voltage from one output polarity to the other only when the current I in the active rectifier group has fallen below a settable value below the limit of continuous current.

Two further amplifiers 32 and 33 are provided to control the selective release or blocking of the triggering pulses. Amplifier 32, for example, is associated with the current rectifier group 1 of FIG. 1 and amplifier 33 with current rectifier group 2. The selection of the current rectifier group required for producing the desired current conduction direction is made in dependence on the polarity of the output signal furnished by amplifier 30, which signal is fed to the direct input of amplifier 32 and to the inverting input of amplifier 33. The other input of each of amplifiers 32 and 33 is connected to ground. In order to realize a time delay in the release or initiation of the triggering pulses, a diode 45 and an RC member 47, 48 connected to a negative operating voltage $U_b$ are disposed at the direct input of amplifier 32 and a diode 46 and an RC member 49, 50 connected to a positive operating voltage $U_b$ are disposed at the inverting input of amplifier 33. The resistance values of resistors 47 and 49 are high compared to the internal resistance of the amplifier 30.

The output signals $U_{32}$ and $U_{33}$ of amplifiers 32 and 33, respectively, control, for example, the electronic switches 7 and 8 of FIG. 1. It is assumed that a negative nominal output voltage from amplifier 32 or 33 represents a signal for initiating the delivery of rectifier triggering pulses and a positive nominal output voltage represents a signal for blocking the delivery pulses.

For example, when the nominal output voltage of amplifier 30 is positive, diode 45 is conductive and diode 46 is blocked, amplifier 32 has a positive and amplifier 33 a negative output voltage. Thus, pulses are released to current rectifier group 2 and the delivery of pulses to currenc rectifier group 1 is blocked. When 30 switches to a negative nominal output voltage, diode 46 becomes conductive and diode 45 is blocked. The input voltage, and thus also the output voltage of amplifier 33 follow practically without delay the signal from amplifier 30 due to the low internal resistance of amplifier 30 compared with that of resistor 49. As a result the delivery of pulses to current rectifier group 2 is blocked. The input voltage to amplifier 32 approaches its new value, after diode 45 is blocked, according to an exponential function, determined by RC member 47, 48, so that 32 switches to its negative nominal output voltage and releases pulses to current rectifier group 1, after the appropriate time delay required for the input voltage to amplifier 32 passes through zero.

A signal $U_R$ for the selective release or blocking of the current controller is formed by diodes 51 and 52 and a resistor 53 connected to a source of a positive operating potential $U_b$. With a negative nominal output voltage at amplifier 32 or 33, the corresponding negative signal $-U_R$ is delivered via diode 51 or 52 which effects release of the controller. When the pulses for both current rectifier groups are blocked amplifiers 32 and 33 both have a positive nominal output voltage and a corresponding positive signal $+U_R$ is produced to block the controller.

In the latter case, the field effect transistor 35 is simultaneously switched, via a diode 54 and the appropriately valued resistors 53, 55 and 56 and independent of the output voltage of amplifier 31, into its conductive state so that amplifier 30 cannot switch back into its previous state for the duration of the time delay occurring in the switching process, whereby each initiated switching process can be completed.

As already mentioned, the rated current value for the current controller must be supplied with an unchanging polarity, e.g. negative, independently of which rectifier group is presently active. This is accomplished by a feedback-connected amplifier 34. A first switching transistor 59 is connected in series with the input resistor 57 for the inverting input of amplifier 34 and a second switching transistor 60 is disposed behind the input resistor 58 for the direct input of amplifier 34, the other side of transistor 60 being grounded. Both transistors 59 and 60 are controlled simultaneously in dependence on the polarity of the output signal generated by the first amplifier 30 to be in either their conducting or blocking state. With a positive nominal output voltage at amplifier 30, the switching transistors 59 and 60, which are preferably designed as field effect transistors, are conductive so that amplifier 34 operates as an inverting unity gain amplifier. With a negative nominal output voltage at 30, transistors 59 and 60 are blocked so that amplifier 34 operates as a direct unity gain amplifier. The output voltage $k \cdot I_s$ of amplifier 34, which is negative in both cases, is then fed to the current controller as the rated current value.

The internal circuitry of the operational amplifiers 30, 31, 32, 33 and 34 is known, for example, from the publication "*uA*741C INTERNALLY COMPENSATED OPERATIONAL AMPLIFIER — Fairchild Linear Integrated Circuits," April 1969, of the firm Fairchild Semiconductor.

The design of the switching logic according to the present invention with modules of the analog computer art results, inter alia, in the significant advantage, compared with known circuits, that the rated current value can be further processed in the form of a positive or negative signal so that the circuit up to and including the memory, i.e., up to the branching point 61 in FIG. 3, can be connected, in a single channel. A further cost reduction is achieved by forming the memory as a regenerative feedback connection of an operational amplifier and furthermore by establishing the channel separation for the release signals by selection of the inverting or direct input of each operational amplifier.

The present invention can be used for controlling the reversing rectifiers in all circuits without circulating current, it being immaterial whether the rectifiers are operated in parallel opposition or cross-connection. If the present invention is to be used for speed or voltage controlled rectifier drives with underlying current control, the switching logic receives the output voltage of the speed or voltage controller as the rated current value. The rectifiers may feed, for example, the armature circuit or the field current circuit of a d.c. motor or generator operated in both rotational directions.

It will be understood that the above description of the present invention is susceptible to various modifications, changes and adaptations, and the same are intended to be comprehended within the meaning and range of equivalents of the appended claims.

We claim:

1. For use in controlling current converters composed of two groups of controlled rectifiers arranged in a circuit which is free of circulating current and includes current means for producing output signals dependent upon the desired value and the actual value of the current in the circuit, a switching logic having inputs coupled to the output of said current means and an output coupled to the two groups of controlled rectifiers for selectively blocking or releasing triggering pulses to the two converter groups in response to the signals applied to said logic inputs and which are dependent on the desired value and the actual value of the current in the circuit, the improvement wherein said logic comprises: a plurality of operational amplifiers connected to operate as switches for processing the input signals to said logic; and a first switching transistor connected between the output and the input of a first of said operational amplifiers so as to form a regenerative feedback branch of said first amplifier for causing said amplifier to operate as a storage element when said switching transistor is conductive and as a signal comparator when said switching transistor is nonconductive so as to enable the polarity of the desired current value to be determined.

2. Switching logic as defined in claim 1 wherein there is a second operational amplifier coupled to the output of said current means for receiving a signal representative of the actual current value and for producing an output indicating whether the actual current value is above or below a predetermined current level, the output of said second amplifier being connected for controlling the conductive state of said switching transistor.

3. Switching logic as defined in claim 2 wherein said first amplifier is arranged to be switched from storage to comparator operation when the actual current value falls below a selected current limit which lies below the limit of continuous current.

4. Switching logic as defined in claim 1 further comprising means for determining the conduction time of each rectifier of a group, said means being connected to said switching transistor for controlling its state.

5. Switching logic as defined in claim 4 wherein said means control said transistor to switch said first amplifier from its storage to its comparator operation when the rectifier conduction time falls below a settable time which is shorter than the minimum conduction time for causing a group of rectifiers to produce a continuous current.

6. Switching logic as defined in claim 1 wherein said switching transistor is a field effect transistor.

7. Switching logic as defined in claim 1 wherein there are third and fourth operational amplifiers each having a direct input, an inverting input and an output connected for controlling the delivery of conduction control pulses to a respective group of controlled rectifiers, the output of said first amplifier is connected to the direct input of said third amplifier and to the inverting input of said fourth amplifier, and the other input of each of said third and fourth amplifiers is connected to ground, whereby pulses are delivered to only a respective one of the rectifier groups depending on the polarity of the output of said first amplifier.

8. Switching logic as defined in claim 7 further comprising: a diode connected in series with the direct input of said third amplifier, a diode connected in series with the inverting input of said fourth amplifier, and a pair of RC arrangements each connected to a respective diode, said diodes and RC members serving to provide a time delay in the release of the triggering pulses to the converter group controlled by each of said third and fourth amplifiers.

9. Switching logic as defined in claim 8 further comprising means connected for switching said first amplifier to its storage function during each such time delay.

10. Switching logic as defined in claim 1 further comprising: a further feedback connected operational amplifier for producing a signal representing the desired current values and having a predetermined polarity and delivering such signal to a current controller; a second switching transistor and an input resistor connected in series with the inverting input of said further amplifier; a second input resistor connected to the direct input of said further amplifier; a third switching transistor connected between the direct input of said further amplifier and ground; and means connected for placing both of said second and third transistors in the same state, which state is determined by the polarity of the output signal produced by said first amplifier and occurs in such a manner that said further amplifier operates as a noninverting unity gain amplifier when said third and fourth switching transistors are nonconductive and as an inverting unity gain amplifier when said third and fourth switching transistors are conductive.

11. Switching logic as defined in claim 10 wherein said third and fourth switching transistors are field effect transistors.

12. Switching logic as defined in claim 1 for use with a speed-controlled converter having a speed controller and provided with an underlying current control, wherein the output voltage of the speed controller is fed to said first amplifier as the desired current value.

* * * * *